United States Patent [19]

Nakao et al.

[11] Patent Number: 5,371,667
[45] Date of Patent: Dec. 6, 1994

[54] ELECTRIC POWER SUPPLY

[75] Inventors: Fumiaki Nakao, Kosai, Japan; Teruhisa Tsumura, Taipei, Taiwan, Prov. of China; Toshihiro Shimizu, Kosai; Toshio Shibata, Chiba, both of Japan

[73] Assignee: Fuji Electrochemical Co., Ltd., Tokyo, Japan

[21] Appl. No.: 76,427

[22] Filed: Jun. 14, 1993

[51] Int. Cl.$^5$ .............................. H02M 7/00
[52] U.S. Cl. ......................... 363/124; 363/37; 363/89
[58] Field of Search .............. 363/34, 37, 47, 89, 363/123, 124

[56] References Cited

U.S. PATENT DOCUMENTS

| | | | |
|---|---|---|---|
| 4,473,784 | 9/1984 | Morez | 363/124 |
| 4,667,283 | 5/1987 | Seki et al. | 363/124 |
| 4,685,046 | 8/1987 | Sanders | 363/89 |
| 5,063,490 | 11/1991 | Maehara et al. | 363/37 |
| 5,072,355 | 12/1991 | Huillet | 363/89 |
| 5,086,383 | 2/1992 | Oda | 363/124 |
| 5,245,522 | 9/1993 | Kawaguchi et al. | 363/37 |

Primary Examiner—Steven L. Stephan
Assistant Examiner—Matthew Nguyen
Attorney, Agent, or Firm—Wenderoth, Lind & Ponack

[57] ABSTRACT

An electric power supply includes: a full-wave rectifier to rectify full-wave rectifying an ac input voltage; a switch for switching an output current of the rectifier; a signal generator for generating a target signal to force a dc output voltage to follow a reference voltage, and a controller for controlling a switching timing of the switch and for repeating the operations of turning off the switch when a current detection signal of the switch complies with the target signal and turning on the switch again after a predetermined short period of time.

8 Claims, 6 Drawing Sheets

(Q1 DRIVING PULSE FREQUENCY;CONSTANT)

ELECTRIC POWER SUPPLY

BACKGROUND OF THE INVENTION

1. Field of the Invention

The present invention relates generally to an electric power supply employing a switching circuit to convert an ac voltage to a stabilized dc voltage. More specifically, the invention relates to an electric power supply capable of improving a power factor thereof.

2. Description of the Related Art

Figure 5:
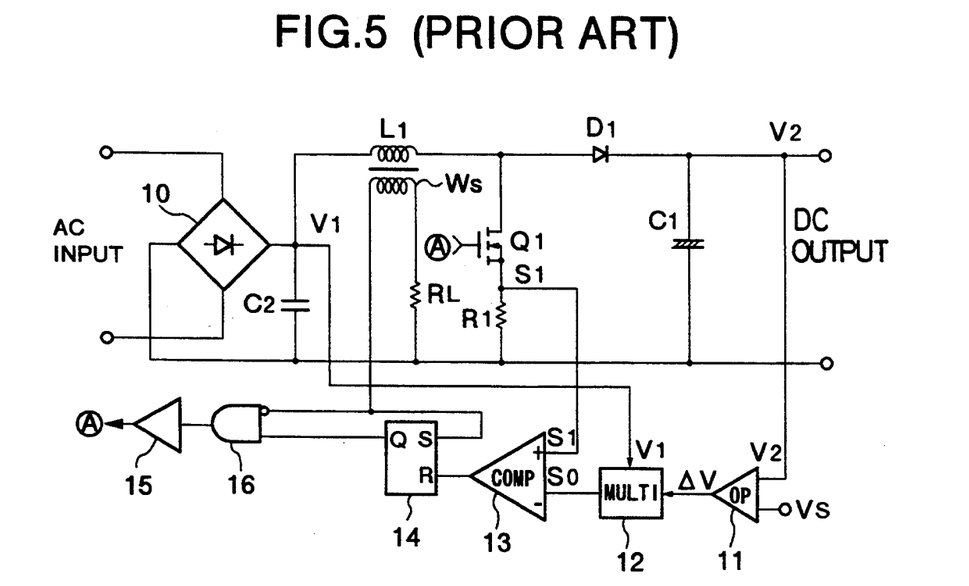
FIG. 5 is a block diagram of a conventional electric power supply.

A known circuitry configuration for an electric power supply to improve a power factor thereof is shown in FIG. 5. In the circuit of FIG. 5, an output of a rectifying circuit 10 for full-wave rectifying an ac input voltage in, is input to a boost chopper circuit. The chopper circuit outputs a stabilized dc voltage.

The chopper circuit in FIG. 5 comprises a switching device Q1 driven with sufficiently higher frequency than that of the input ac voltage, an inductor L1 connected in series with the switching device Q1 between output terminals of the rectifying circuit 10, and a diode D1 and a capacitor C1 connected in series between the input and output terminal of the switching device Q1 in order to let an output current flow through the inductor L1 during the OFF state of the switching device Q1. The capacitor C1 has a substantially large capacity so that a smoothed and stabilized dc output voltage is supplied therefrom. It should be noted that a capacitor C2 in the input side of the chopper circuit is disposed for absorbing a high frequency ripple, with a small capacity, and is dispensable for the circuit.

An output voltage V2 of the chopper circuit is controlled so as to comply with a reference voltage Vs. An error voltage between V2 and Vs is detected by an error amplifier 11, and the output signal of the amplifier 11, an error signal ΔV, is input to a multiplier 12. An input voltage V1 (i.e., a full-wave rectified input ac voltage) is also input to the multiplier 12. The multiplier 12 multiplies V1 of the chopper circuit by ΔV to generate and output a threshold signal S0 with a full-wave rectified waveform, in which its phase is same as that of the input voltage of the chopper circuit, and its amplitude corresponding to the signal ΔV.

The instantaneous value of the current through the switching device Q1 in the chopper circuit is detected by a resistor R1. A current detection signal S1 measured as a voltage drop of R1 is compared with the threshold signal S0 by a comparator 13. During the ON state of Q1, the current flowing through Q1 via the inductor L1 keeps increasing gradually. The current detection signal S1 also increases along with the Q1 current increase and the output signal of the comparator 13 turns HIGH when S1 reaches S0. The output signal of the comparator 13 resets a flip-flop 14.

The circuit shown in FIG. 5 is so constructed that a driver 15 makes the switching device Q1 turn on while the Q output of the flip-flop 14 is maintained HIGH; therefore, the flip-flop 14 is reset when the current detection signal S1 representing the current through the switching device Q1 reaches the threshold signal S0. Consequently, the Q output of the flip-flop 14 turns LOW and the switching device Q1 is forced to turn off.

Figure 6:
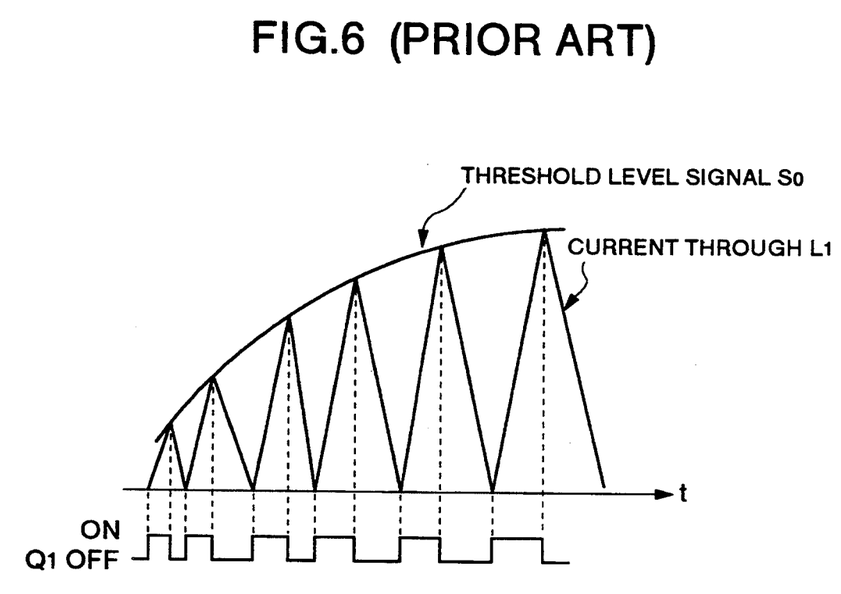
FIG. 6 is a waveform of a main part of the power supply shown in FIG. 5.

As shown in FIG. 6, the current flowing to the output side from the inductor L1 via the diode D1 gradually decreases after the switching device Q1 turns off. The inductor L1 is provided with a secondary winding Ws for detecting the current through the primary winding of L1. When Q1 turns off, the back electromotive force of L1 sets the flip-flop 14. The output signal of the driver 15 is set HIGH via an AND circuit 16 at the time the current of L1 falls to zero.

Namely, when the current through the inductor L1 decreases to be zero, the switching device Q1 turns on and the current through the inductor L1 and the switching device Q1 gradually increases. Then, when the current through L1 and Q1 reaches to the threshold signal S0 value, Q1 turns off and the current through L1 gradually decreases. According to the above described repeating operations, as shown in FIG. 6, the switching device Q1 is driven to ON or OFF with sufficiently higher frequency than that of the ac input voltage and the dc output voltage is so controlled that the envelope of the current through the inductor L1 follows the threshold signal S0, i.e., a full-wave rectified waveform of the ac input voltage.

As is apparent from the above description, in the existing electric power supply shown in FIG. 5, the waveform of the instantaneous current through the inductor L1 consists of a series of serrated pulses and the envelope thereof forms a full-wave rectified waveform as shown in FIG. 6. Therefore, as the peak value of the output current becomes substantially larger than the effective value thereof, a large ripple current flows into a capacitor connected to the input line (not shown) and the capacitor C2 with a relatively small capacity for absorbing ripple component of the input voltage. As a result, those capacitors become heated and/or line reflection noise may increase. Moreover, when this circuit configuration is applied to a large capacity electric power supply, the switching device Q1 is required to have a large rated current in order to endure the peak value of the serrated current larger than the effective current. Additionally, the inductor L1 included in the above existing electric power supply is provided with the secondary winding Ws and thus, the inductor L1 becomes expensive.

Figure 7:
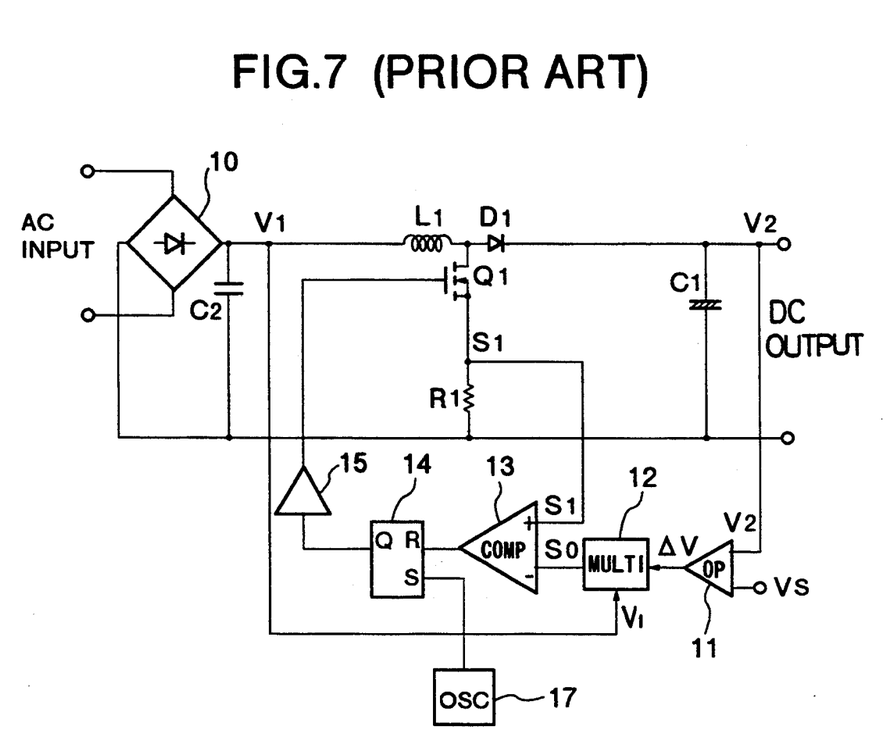
FIG. 7 is a block diagram of another conventional electric power supply.

The circuit arrangement of an electric power supply designed for overcoming the above problems of the circuit in FIG. 5 is shown in FIG. 7. This circuit is so constructed that an oscillator 17 is connected to the set (S) terminal of the flip-flop 14 and the output signal of the comparator 13 is input to the reset (R) terminal of the flip-flop 14.

The operation of the circuit in FIG. 7 will be described herebelow. The instantaneous value of the current passing the switching device Q1 in the chopper circuit is detected as a terminal voltage of the resistor R1. The terminal voltage of R1 is input to the non-inverting terminal of the comparator 13 as the current detection signal S1. The comparator 13 compares S1 with S0 input to the inverting terminal of the comparator 13 from the multiplier 12.

The flip-flop 14 and the driver 15 driving the switching device Q1 force the device Q1 to turn on in response to the pulse signal input from the oscillator 17, with sufficiently higher frequency than that of the ac input voltage, and make Q1 turn off for the output of the comparator 13. During ON state of Q1, the current passing the device Q1 via the inductor L1 gradually increases. When the current detection signal S1 reaches the threshold signal S0, the Q output of the comparator 13 turns to HIGH. The signal appearing at the Q output of the comparator 13 resets the flip-flop 14 to force the device Q1 to turn off. As the above circuit operations are repeated in synchronism with the high frequency pulses input from the oscillator 17, the dc output voltage is so controlled that the envelope of the current through the inductor L1 complies with the threshold signal S0, i.e., a full-wave rectified waveform of the ac input voltage.

Figure 8A:
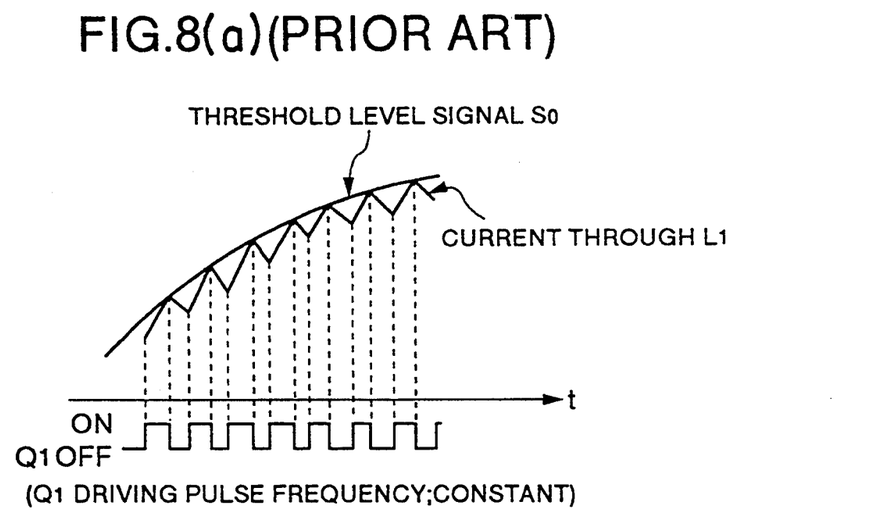
FIGS. 8(a)-8(c) are waveforms of a main part of the power supply shown in FIG. 7.
Figure 8B:
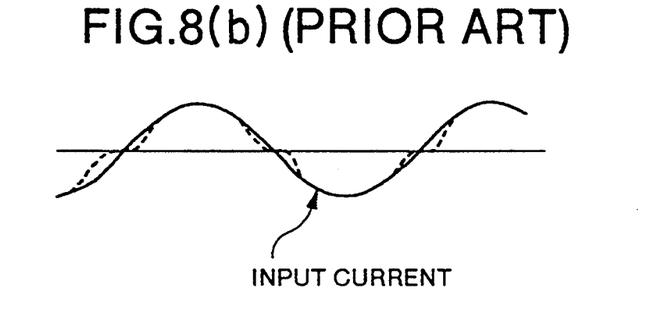
Figure 8C:
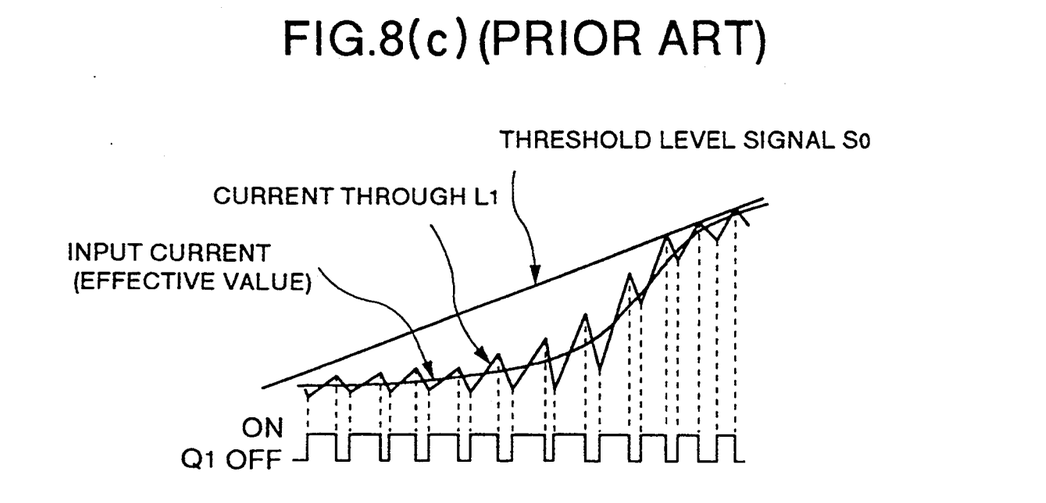

According to the circuit construction in FIG. 7, as shown in FIG. 8(a), the peak value of the current in the inductor L1 can be reduced compared with that of the circuit in FIG. 5, thus the heating of the capacitors and the increase in the line reflection noise are relieved. However, as the device Q1 is driven by constant frequency pulses and the acute peak of the line reflection noise appears around the oscillation frequency of the oscillator 17, a noise filter with large damping effect must be employed in the circuit. Moreover, the difference between the input voltage and the output voltage is so large that the current through the inductor L1 cannot reach the threshold signal S0 and the input current waveform cannot become a sine wave because of inevitable distortion even though the ON pulse width of the driving pulses is maximized. (FIGS. 8 (a),(b))

SUMMARY OF THE INVENTION

Therefore, it is an object of the present invention to provide an electric power supply capable of lowering a peak value of the switched output current.

Moreover, it is another object of the present invention to provide an electric power supply to prevent the switched output current from being excessively lowered around the points where an ac input voltage crosses a zero voltage level, i.e., zero-crossing points.

In order to accomplish the above-mentioned and other objects, an electric power supply, according to one aspect of the invention, comprises:

a rectifier for full-wave rectifying an ac input voltage;

a switch for switching an output current of the rectifying a signal generator;

a signal generator for providing a target signal to force a dc output voltage to follow a reference voltage; and a controller for controlling a switching timing of said switch, the controller repeating the operations of turning off the switch when a current detection signal of the switch complies with the target signal and turning on the switch again after a predetermined short period of time.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
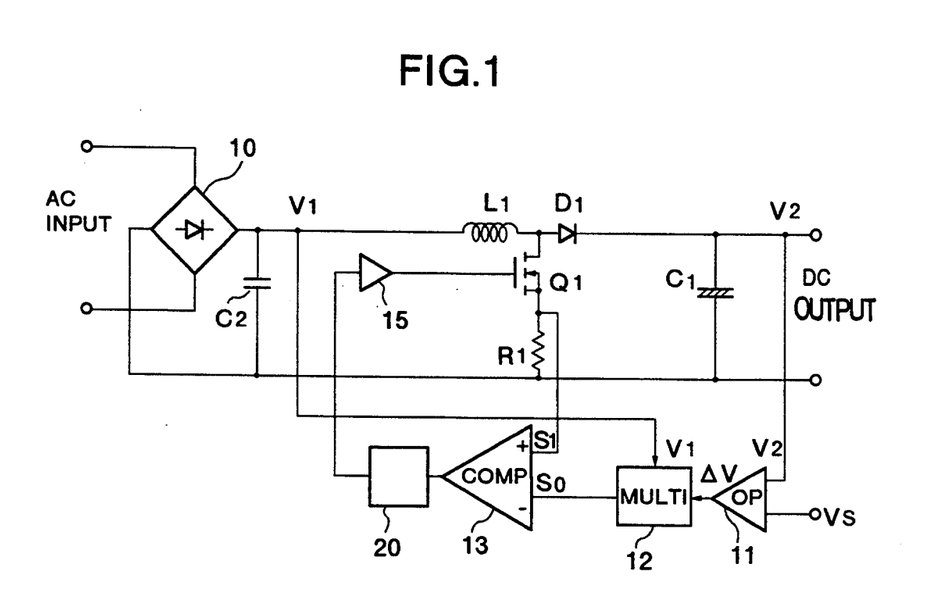
FIG. 1 is a block diagram of the preferred embodiment of an electric power supply according to the present invention.

FIG. 1 shows a block circuit diagram of a preferred embodiment of an electric power supply of the invention. As shown in FIG. 1, the power supply according to the present invention is provided with distinctive features from the conventional electric power supplies in FIGS. 5 and 7.

One feature is that the inductor L1 in FIG. 1 circuit is not provided with a secondary winding for current detection. As another feature, the circuit is equipped with a mono-stable multivibrator 20 instead of the conventional flip-flop 14 shown in FIGS. 5 and 7.

The error amplifier 11 and the multiplier 12 generate the threshold signal S0 having a full-wave rectified waveform with the same phase as that of the input current V1 of the chopper circuit and the amplitude corresponding to the error voltage $\Delta V$ for the dc output voltage V2.

The current through the switching device Q1 is detected as the voltage appearing at the terminals of the resistor R1. The output signal of the comparator 13 is inverted to trigger the multivibrator 20 when the current detection signal S1 reaches the threshold signal level S0.

The output signal of the multivibrator 20 is maintained at a LOW level during a predetermined short period of time after said triggering and then inverted to a HIGH level. The device Q1 is controlled so as to be in an ON state while the output signal of the multivibrator 20 stays HIGH and to go to an OFF state while the output signal is LOW.

Figure 2:
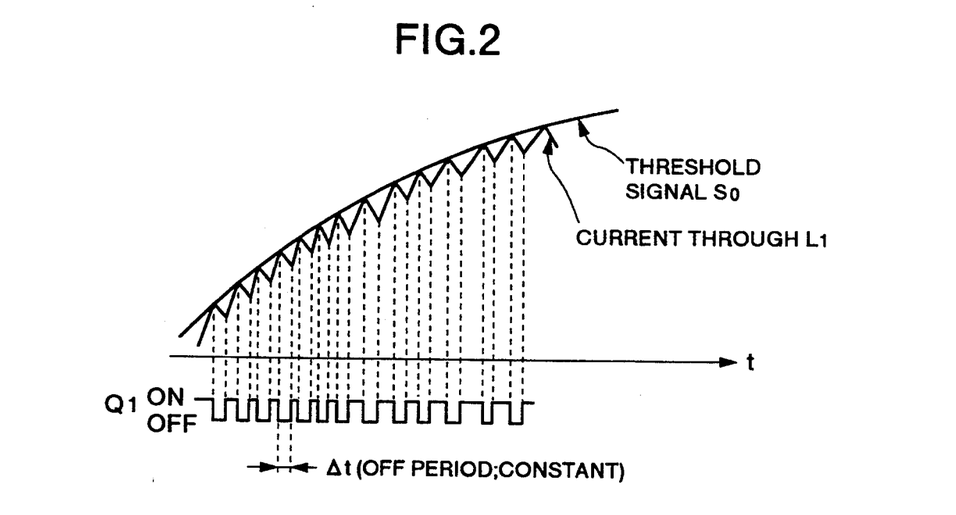
FIG. 2 is a waveform of a main part of the power supply shown in FIG. 1.

The OFF period of Q1, determined by the monostable multivibrator 20, is set sufficiently short, thus so that Q1 turns on again when the current through L1 has slightly decreased from S0 level as shown in FIG. 2. Therefore, as the instantaneous value of the current of the inductor L1 does not fall to a zero level, the peak-to-peak value of the input current can be significantly lowered.

Figure 3:
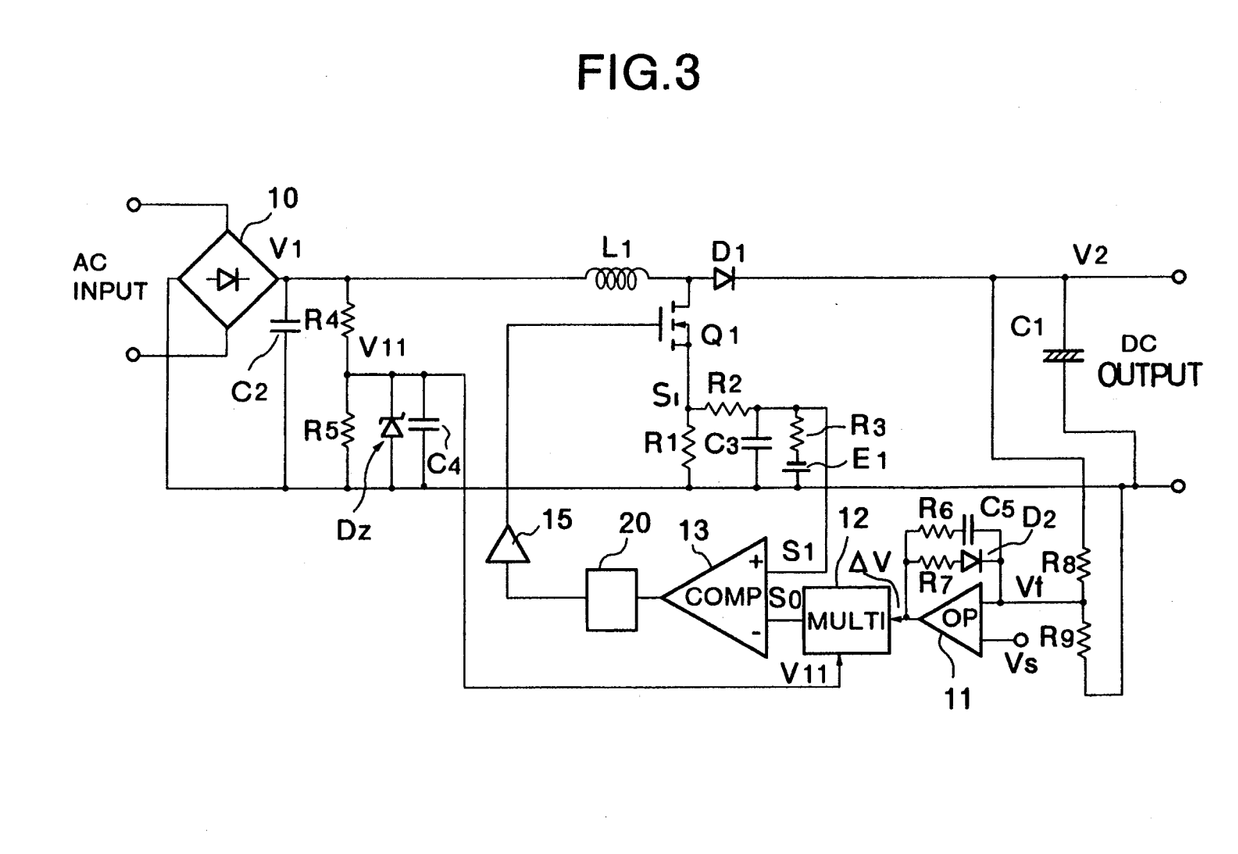
FIG. 3 is a block diagram of another embodiment of an electric power supply according to the present invention.

Another embodiment according to the present invention will be discussed herebelow referring to FIG. 3. The basic construction of the electric power supply in FIG. 3 is substantially the same as that of the power supply in FIG. 1 except for three additional circuit blocks as follows:

(a) A low pass filter including a resistor R2 and a capacitor C3 is inserted in the input line of the current detection signal S1 as a terminal voltage of the resistor R1 to the comparator 13. A series element of a resistor R3 and a constant voltage source E1 is connected to the capacitor C3 in parallel.

(b) Dividing resistors R4 and R5 are connected between output terminals of the rectifying circuit 10. A zener diode Dz is connected in parallel to the resistor R5 in the line feeding an input voltage signal V11 from the point between R4 and R5 to the multiplier 12. A capacitor C4 is connected in parallel with the zener diode Dz.

(c) Dividing resistors R8 and R9 are disposed for generating a divided voltage Vf of the output voltage V2 of the chopper circuit. A negative feedback loop circuit consisting of a parallel combination of both a series connected combination of a resistor R6 and a capacitor C5, and a series connected combination of a resistor R7 and a diode D2, is connected between the output terminal and the inverting input terminal of the error amplifier 11 so that the cathode of the diode D2 is directed to the inverting input terminal of the amplifier 11.

OPERATION OF THE CIRCUIT BLOCK (a)

The low pass filter consisting of the resistor R2 and the capacitor C3 is provided to absorb noise superimposed on the current detection signal S1 to prevent the pulse noise from being fed to the comparator 13. Namely, the filter prevents malfunctioning of the comparator 13 due to the noise superimposed on the input line of the current detection signal S1 and turning off of the switching device Q1 prior to the correct turn off timing thereof. A waveform of a terminal voltage of the resistor R1 is filtered by the low pass filter, and thus, the current detection signal S1 becomes an envelope of the terminal voltage of R1.

It should be noted that, in case the low pass filter is disposed without the accompanying resistor R3 and the constant voltage source E1, the current detection signal S1 obtained via R2 and C3 is not set to be zero because of a time constant of R2 and C3, even when the terminal voltage of R1 becomes zero on the occasion that the current through Q1 is reduced to zero. The resistance of R2 to which the terminal voltage of R1 is applied, should be significantly large in order to minimize the power consumption for controlling the switching circuit. Therefore, it is inevitable that the capacitor C3 has a relatively high remaining voltage when the terminal voltage of R1 becomes zero. As described above, the current detection signal S1 input to the comparator 13 is incapable of falling to a zero level as the terminal voltage of the capacitor C3 remains; thus, the device Q1 is driven based on the incorrect current detection signal S1. As a result, a waveform of the ac input current excluding the high frequency ripple component therefrom cannot become a correct sine wave and the ac input current is lowered in excess near the zero-crossing points. The distortion of the ac input voltage occurring near the zero-crossing points, in case the above described circuit is applied to a power supply employing a three-phase four-wire system, causes a relatively large neutral current, which is sum of the distortion component in each phase. The switching device Q1 is driven in response to the driving pulses when the current detection signal S1 falls to a zero level. A negative voltage provided by E1 and input to the output side of the low pass filter through the resistor R3 cancels the remaining voltage of C3 and the current detection signal S1 is compensated to become zero at each zero-crossing point of the ac input voltage.

OPERATION OF THE CIRCUIT BLOCK (b)

According to the above construction of the circuit block (b), as a voltage V11 input to the multiplier 12 is obtained by clipping the input voltage V1 with the zener diode Dz, an error signal $\Delta V$ cannot become excessively small when the ac input voltage is extraordinarily high; thus, an operation of the overall switching control circuit is stabilized.

The operation of the circuit block (b) will be more precisely described herebelow. It is assumed that an output power should be maintained constant in the circuit shown in FIG. 3. When an input voltage V1 is higher, an input current becomes smaller as the output power is assumed to be constant. Then, V1 becomes higher, the threshold signal S0, i.e., a reference current value, output from the multiplier 12, becomes smaller. Among two inputs of the multiplier 12, the input voltage signal V11 has become larger in proportion to the input voltage V1. The error signal $\Delta V$ from the error amplifier 11 has become very small. Then, S0 from the multiplier 12 also becomes small. When the ac input voltage is high; the error signal $\Delta V$ is extremely small, or nearly equal to zero, therefore, the circuit is very sensitive to noise and the operation thereof is inclined to become unstable. The upper limit of the ac input voltage is so defined that such deficiencies do not occur.

In order to avoid the above shortcomings, it may be taken into consideration to increase a voltage division ratio R4/R5 so as to reduce the input voltage signal V11. The above possible countermeasure, however, accompanies another deficiency in that the input voltage signal V11 becomes too small where the input voltage V1 stays low and durability for noise on the V11 signal transmission line will be deteriorated. On the other hand, as another possible measure, it may be thought effective to employ a resistor with a positive temperature coefficient as the dividing resistor R4 or a resistor with a negative temperature coefficient as the dividing resistor R5 in order to regulate the division ratio R4/R5 automatically in response to the input voltage. In case this method is employed, however, the above-mentioned object of the circuit block (b) cannot be achieved until the temperature of each dividing resistor R4 and R5 is stabilized. Consequently, it will be understood that a stabilized output voltage cannot be obtained for a broad range of an input voltage if the zener diode Dz is not disposed in the circuit.

When the zener diode Dz limits the input voltage, the input voltage signal V11 has a full-wave rectified wave form with its peaks clipped by the zener voltage of Dz. Thus, an effect of improving a power factor by letting the input current waveform follow the input voltage waveform may be somewhat weakened. Instead, the more practical advantage that the power supply circuit can operate stably for high input voltage can be obtained. It should be noted that the noise absorbing capacitor C4 is preferably disposed with a capacity which does not cause a substantial phase shift along with the dividing resistors R4 and R5, though the capacitor C4 is not essential to the circuit of the embodiment.

OPERATION OF THE CIRCUIT BLOCK (c)

In case that the output voltage V2 of the chopper circuit is low at the occasion such as starting-up of the circuit, the output voltage $\Delta V$ of the error amplifier 11 remains at a HIGH level which is higher than the reference voltage Vs. The capacitor C5 is continuously charged during this period. When V2 reaches the predetermined value, the amplifier 11 output is inverted and $\Delta V$ starts to decrease to become a LOW level which is lower than Vs. Simultaneously, the capacitor C5 begins to discharge. At this time, C5 discharges via a series connection of the resistor R7 and the diode D2 because the control voltage $\Delta V$ is still at a HIGH level. Thus, $\Delta V$ promptly reaches a LOW level without being interfered with by discharging of C5 and, the at the same time, gain of the amplifier 11 is kept LOW because D2 remains in its ON state. Consequently, overshooting of V2 can be reduced and transition period of the power supply circuit can be shortened.

If the diode D2 is not provided with the negative feedback loop, the divided voltage Vf cannot be represented by simply dividing V2 according to the dividing resistors R8 and R9. In that case, Vf is varied in response to the current flowing into C5 through R6; therefore, the output voltage V2 is also varied. If D2 is provided with the negative feedback loop and the circuit is designed so that V2 can be stabilized at a predetermined set value in case ΔV is not greater than Vs, the output voltage of the power supply can be precisely stabilized as D2 remains OFF state during steady state.

Figure 4:
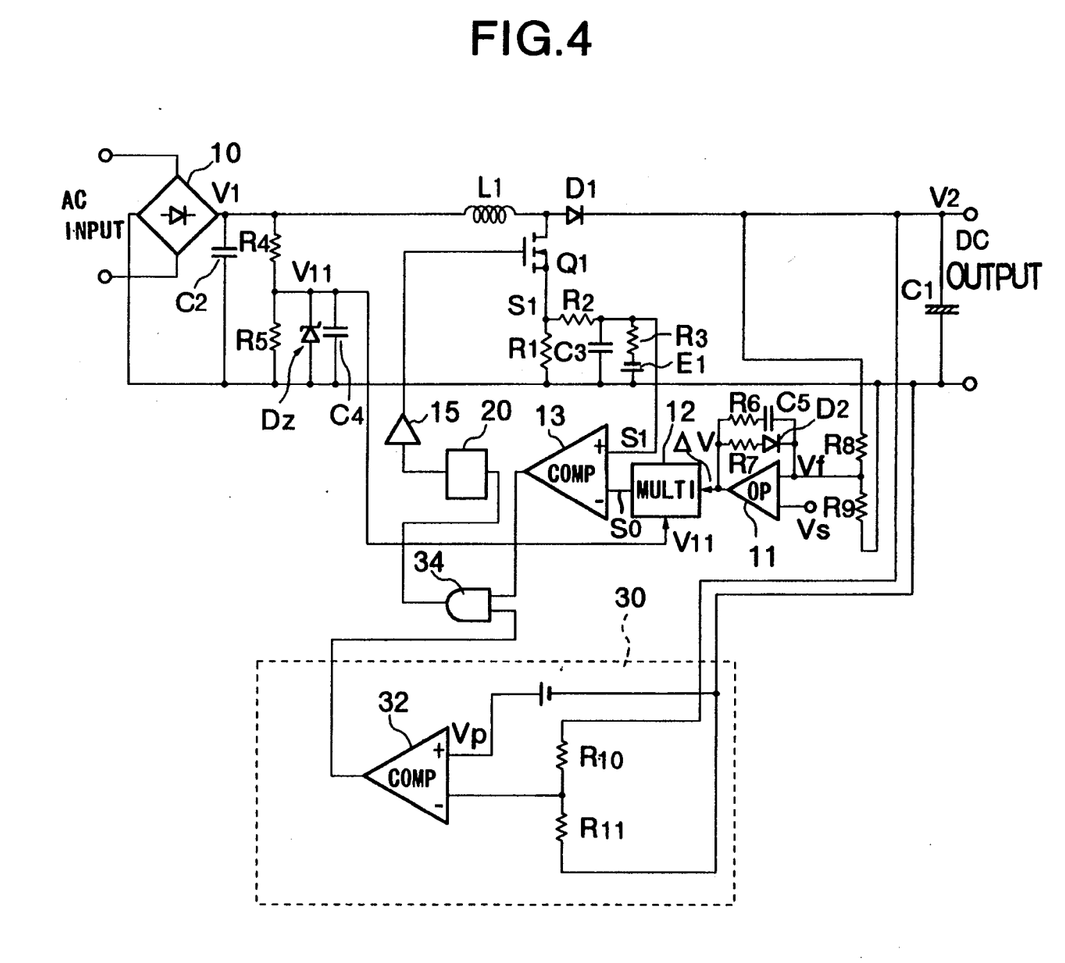
FIG. 4 is a block diagram of a further embodiment of an electric power supply according to the present invention.

A power supply shown in FIG. 4 has additionally an overvoltage protection circuit as compared with the circuit in FIG. 3. The output voltage V2 is divided by dividing resistors R10 and R11. A comparator 32 compares the divided voltage with an overvoltage detecting preset value Vp and output an overvoltage protection signal to stop the switching device Q1 when the divided voltage exceeds Vp. The overvoltage protection signal and the output signal of the comparator 13 are input to an AND circuit 34. Oscillation of the output signal of the AND circuit 34 is stopped to turn off Q1 while the overvoltage protection signal is generated, i.e., V2 is greater than Vp.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as being limited to the specific embodiment set out above but to include all possible embodiments which can be embodied within a scope encompassed and equivalents thereof with respect to the features set out in the appended claims.

What is claimed is:

1. An electric power supply comprising:
   a rectifier, said rectifier full-wave rectifying an ac input voltage;
   a switch, said switch switching an output current of said rectifier;
   a signal generator, said generator generating a target signal to force a dc output voltage to follow a reference voltage; and
   a controller, said controller controlling a switch timing of said switch and said controller repeating the operations of turning off said switch when a current detection signal of said switch complies with said target signal and turning on said switch again after a predetermined short period of time;
   wherein said switch further comprises: a switching device driven with sufficiently higher frequency than that of the ac input voltage; an inductor connected in series with said switching device between output terminals of said rectifier, and a capacitor for smoothing a current fed through said inductor to supply a stabilized dc output voltage;
   and wherein said controller further comprises: a converter, said converter converting an output current of said switching device into a voltage signal; a comparator, said comparator comparing said voltage signal with said target signal, and an inverter, said inverter inverting an output signal thereof when said voltage signal reaches said target signal, and then inverting said output signal again after a predetermined short period of time; and
   wherein said inverter further comprises another comparator, to which said target signal and said voltage signal are input, representing output current of said switching device and a monostable multivibrator connected to an output terminal of said another comparator.

2. An electric power supply comprising:
   a rectifying circuit for full-wave rectifying an ac input voltage into output pulsating current;
   a chopper circuit comprising: a switching device driven with sufficiently higher frequency than that of the ac input voltage; an inductor connected in series with said switching device between output terminals of said rectifying circuit, and a capacitor for smoothing a current fed through said inductor to supply stabilized dc output voltage;
   a signal generator, said generator generating a target signal having a full-wave rectified waveform, in which the phase thereof is same as that of said ac input voltage, and an amplitude corresponding to an error voltage included in an output voltage of said chopper circuit;
   a controller, said controller controlling a switching timing by repeating the operations of turning off said switching device when a current therethrough reaches said target signal and turning on said switching device again after a predetermined short period of time; and
   a current detection resistor connected in series with said switching device in said chopper circuit, a low pass filer, to which the terminal voltage of said current detection resistor is input, and a dc voltage source for adding a predetermined dc voltage to the output of said low pass filter.

3. An electric power supply comprising:
   a chopper circuit for switching a pulsating input obtained by full-wave rectifying an ac input voltage with a high frequency to provide a smoothed dc output voltage at the terminals of an output capacitor;
   a first voltage dividing circuit for detecting an input voltage of said chopper circuit;
   a second voltage dividing circuit for detecting an output voltage of said chopper circuit;
   a current detection circuit for detecting a switching current of said chopper circuit;
   a voltage error detecting circuit for detecting an error voltage of the output voltage of said chopper circuit as compared to a reference voltage;
   a multiplier for multiplying an error signal of said voltage error detecting circuit by an input voltage signal detected by said first voltage dividing circuit; and
   a controller, said controller controlling a switching operation of said chopper circuit by comparing a voltage signal output from said multiplier with a current signal output from said current detection circuit and repeating the operation of turning off said chopper circuit when the current through said switching device in said chopper circuit reaches said voltage signal level and turning on said switching device again after a predetermined short period of time in order to force the input current waveform to follow the input voltage waveform.

4. An electric power supply as set forth in claim 3, further comprising a voltage limiting circuit for preventing an excessive output of said first voltage dividing circuit from being input to said multiplier, which is disposed in a circuit for inputting the output of said first voltage dividing circuit for detecting the input voltage of said chopper circuit to said multiplier.

5. An electric power supply as set forth in claim 4, wherein said voltage limiting circuit comprises a zener diode operating as a voltage limiting device.

6. An electric power supply as set forth in claim 3, wherein said voltage error detecting circuit comprises an operational amplifier for amplifying said error voltage, a negative feedback loop circuit consisting of a parallel combination of both a series connected combination of a resistor and a capacitor, and a series connected combination of another resistor and a diode, which is connected between the output terminal and the inverting input terminal of said operational amplifier so that a cathode of said diode is directed to the inverting input terminal of said operational amplifier.

7. An electric power supply comprising:
a chopper circuit for switching a pulsating input obtained by full-wave rectifying an ac input voltage with a higher frequency to provide a smoothed dc output voltage at the terminals of an output capacitor;
a first voltage dividing circuit for detecting an input voltage of said chopper circuit;
a second voltage dividing circuit for detecting an output voltage of said chopper circuit;
a current detection circuit for detecting a switching current of said chopper circuit;
a low pass filter connected in series with said current detection circuit;
a dc voltage source for adding a predetermined dc voltage to the output of said low pass filter;
an operational amplifier for detecting an error voltage of the output voltage of said chopper circuit as compared to a reference voltage;
a negative feedback loop circuit consisting of a parallel combination of both a series connected combination of a resistor and a capacitor, and a series connected combination of another resistor and a diode, which is connected between the output terminal and the inverting input terminal of said operational amplifier so that a cathode of said diode is directed to the inverting input terminal of said operational amplifier;
a multiplier for multiplying an error signal of said operational amplifier by an input voltage signal detected by said first voltage dividing circuit;
a voltage limiting circuit for preventing an excessive output of said voltage dividing circuit from being input to said multiplier, which is disposed in a circuit for inputting the output of said first voltage dividing circuit for detecting the input voltage of said chopper circuit to said multiplier; and
a switching operation controlling circuit for controlling said chopper circuit by comparing a voltage signal output from said multiplier with a current signal output from said current detection circuit and repeating the operations of turning off said chopper circuit when the current through said switching device in said chopper circuit reaches said voltage signal level and turning on said chopper circuit again after a predetermined short period of time in order to force the input current waveform to follow the input voltage waveform.

8. An electric power supply as set forth in claim 7, further comprising: an overvoltage protection circuit comprising a voltage dividing circuit for providing an overvoltage monitoring signal by dividing the output voltage of said chopper circuit; a reference voltage source for supplying an overvoltage detecting signal, and an overvoltage protection circuit, to which said overvoltage monitoring signal and said overvoltage detecting signal are input, said overvoltage protection circuit inverting an output thereof to turn off said switching device of said chopper circuit when said overvoltage monitoring signal exceeds said overvoltage detecting signal.

* * * * *